United States Patent
Ballantyne et al.

(10) Patent No.: US 6,931,470 B2
(45) Date of Patent: Aug. 16, 2005

(54) DUAL ACCESS SERIAL PERIPHERAL INTERFACE

(75) Inventors: Wayne W. Ballantyne, Plantation, FL (US); Robert J. Bero, Spring Grove, IL (US); Dennis J. Cashen, Lake Zurich, IL (US); Richard T. Unetich, Lake Forest, IL (US)

(73) Assignee: Motorola, Inc., Schaumburg, IL (US)

( * ) Notice: Subject to any disclaimer, the term of this patent is extended or adjusted under 35 U.S.C. 154(b) by 341 days.

(21) Appl. No.: 10/074,533

(22) Filed: Feb. 11, 2002

(65) Prior Publication Data

US 2003/0154336 A1 Aug. 14, 2003

(51) Int. Cl.[7] .............................................. G06F 13/00
(52) U.S. Cl. ..................................... 710/107; 710/110
(58) Field of Search ............................... 710/107, 110, 710/243–244, 200, 220, 240, 105, 10, 36, 104, 51

(56) References Cited

U.S. PATENT DOCUMENTS

| | | | | |
|---|---|---|---|---|
| 5,023,775 A | * | 6/1991 | Poret | 326/40 |
| 5,166,678 A | * | 11/1992 | Warrior | 340/870.15 |
| 5,339,443 A | * | 8/1994 | Lockwood | 710/244 |
| 6,496,880 B1 | * | 12/2002 | Ma et al. | 710/38 |
| 6,662,253 B1 | * | 12/2003 | Gary et al. | 710/244 |
| 2003/0036368 A1 | * | 2/2003 | Higgs | 455/92 |
| 2003/0145144 A1 | * | 7/2003 | Hofmann et al. | 710/110 |

* cited by examiner

Primary Examiner—Glenn A. Auve
Assistant Examiner—Nimesh Patel
(74) Attorney, Agent, or Firm—Brian M. Mancini; Randall S. Vaas

(57) ABSTRACT

A dual access peripheral interface uses a shared data bus (16) for communication with dual master units (30,32) coupled to a common peripheral device (34). Each master control unit provides a shared subset of control bits to a logic configuration block (48), which combines the control bits in a logic operation to present to the slave peripheral unit (34). The logic configuration block (48) is configured by configuration bits accessible by only one of the master units (30). In this way, both of the master units can access the peripheral at the same time with the logic of the logic configuration block determining the ultimate control of the peripheral.

21 Claims, 5 Drawing Sheets

FIG. 2 —PRIOR ART—

| D3a | D3b | C3 LOGIC |
|---|---|---|
| 0 | 0 | C3 = A3 |
| 0 | 1 | C3 = A3+B3 |
| 1 | 0 | C3 = A3*B3 |
| 1 | 1 | C3 = B3 |

DUAL ACCESS SERIAL PERIPHERAL INTERFACE

FIELD OF THE INVENTION

The present invention relates generally to communication between electronic devices. More particularly, the present invention is directed to peripheral interface operation in a communication device.

BACKGROUND OF THE INVENTION

A communication device such as a cellular radiotelephone can contain many control devices that can interface to a variety of peripheral devices. Normally, control-to-peripheral communication can be thought of in a master/slave relationship where a master unit can control operation of a peripheral unit through a communication bus, such as a serial peripheral interface (SPI) as is known in the art. The communication bus and peripheral include internal components, which are able to receive information in bit form from other devices and to create a data field from the received information. All messages sent over the communication bus contain data fields. Although the messages are mainly for information transfer and control, the data fields can contain header bits for message handling information, including a priority field, a register select field, and an address field designating the address or addresses of the device(s) originating or receiving the message.

Generally, a peripheral device can be considered as an external device that attaches to a main device, such as a printer connected to a computer for example. However, this is a simplified view, and, in the context of a radiotelephone, a master (control) unit or slave (peripheral) unit can be considered on a component level. For example, an accessory can be connected to a radiotelephone wherein a component in the radiotelephone can be slaved to a controller on the accessory. One example of this is having an audio accessory plug into the radiotelephone with the accessory controlling an audio amplifier circuit in the radiotelephone.

In addition, components entirely within the radiotelephone can have a master/slave relationship. One example of this is having the main processor of the radiotelephone act as a master unit and a memory module, such as a serial EEPROM, act as a slave unit. Another example is having the main processor of the radiotelephone act as a master unit and a transceiver integrated circuit or digital signal processor act as a slave unit. A further example is having the main processor of the radiotelephone act as a master unit and an amplifier circuit act as a slave unit. All of these relationships can be controlled using a communication interface.

FIG. 1 shows a prior art system architecture using a synchronous control interface or SPI in a master/slave(s) configuration. In this typical configuration, the master device 10 sends serial data over a communication bus 14 to a slave device 12 such as a transceiver IC, serial EEPROM, or amplifier, for example. Basically, the SPI is a master/slave arrangement that allows two shift registers 16,18 to exchange data. Since it is not really "peer-to-peer", like a universal asynchronous receiver/transmitter, it is typically used by a microcontroller to send data to "dumb" devices. The master unit transmits the data sequentially shifted bit-by-bit into a register within the peripheral. Some of bits are data, while other bits are control bits. Generally, flow control bits, priority bits, address bits or other format bits are added to the bits shifted into the register to comprise a bus format for messages that are sent from the central processing portion of the radiotelephone. Each peripheral has a particular chip select or address that is defined during a start-up procedure, as is known in the art. The data bits in the shift register 18 are then parallel gated, through a tri-state buffer for example, into an output latch register 20.

The basic signals used on the communication bus 14 are Master Out/Slave In (MOSI), Master In/Slave Out (MISO), Serial Clock (SCK), Slave Select ($\overline{SS}$), and master signal Chip Select ($\overline{CS}$). The MOSI line is a serial data line from the master to the slave device. The MISO line is a serial data line from the slave to the master device. The SCK line is the shift register clock from the master that clocks both Master and Slave shift registers. Note that although FIG. 1 suggests one shift register 16,18 being used (on each of master and slave) for both sending and receiving data, in most implementations, separate registers can be provided. The $\overline{SS}$ line of the slave 12 is shown as being driven by the $\overline{CS}$ line of the master 10. This low true signal is used to enable the SPI peripheral on the slave device. It would typically gate SCK on or off in the slave, and also tri-state or enable MISO from the slave device. In other words, when $\overline{SS}$ is Low (asserted), MISO is enabled and SCK is gated on. Correspondingly, when $\overline{SS}$ is High (de-asserted), MISO is tri-stated and SCK is gated off to stop data from coming into the slave device when it is not being selected. Alternatively, (as shown) $\overline{SS}$ de-assertion inhibits the transfer of data flowing into the shift register 18 to the latch register 20 rather than directly gating the clock and disabling MISO. The end result is the same in that $\overline{SS}$ de-assertion disables the SPI function of the slave device.

The reason that MISO must be tri-stated is that the SPI typically supports multiple devices, each sharing the same MOSI, MISO, and SCK, but having individual chip selects. The de-assertion of $\overline{SS}$ for each device must cause MISO for that device to tri-state, otherwise contention would occur when more than one slave device is connected to MISO. It should also be noted that some SPI slave devices may be "write only" and would not have a MISO line.

Basic SPI operation is as follows. Initially, $\overline{CS}$ is de-asserted and SCK is idle (high or low). The Master unit 10 asserts $\overline{CS}$ to the slave device 12 it wants to send data to. After some small setup delay, the master unit 10 clocks out data on MOSI and reads in data on MISO (if available), using the SCK signal. The same clock edge used to transfer MOSI data to the slave shift register 18 is also use to latch in data from the slave MISO into the master shift register 16. The SPI configuration bits, however, allow for high or low going edges to be used. Typical transfers would involve 8 or 16 bits. In more sophisticated designs, much larger SPI queues are used, allowing for 64 bytes or more to be transferred. When the transfer is finished (i.e., the last bit of the last word is shifted in/out), the SCK signal idles (high or low) and a short time later $\overline{CS}$ is de-asserted again. In the configuration shown, only the master unit can initiate a data transfer. However, in configurations where there are two master units vying for control of one slave peripheral, there are different considerations.

In those architectures where there are two or more processors present, prior art solutions provide for arbitration for control of a single SPI slave device. This allows certain functions of the slave device to be enabled/disabled by either processor. Unfortunately, the standard SPI architecture uses only a single SPI slave port per slave device. Any arbitration between two masters and one slave would have to be via external multiplexers 22 between the master's SPI outputs and the slave's inputs, as shown in FIG. 2. The drawback to this scheme is that only one master unit can access the slave device at a time. In addition, the software arbitration creates complexities in the software architecture.

A practical example of the problems caused by lack of a dual access SPI is the case where a main processor controls a component, such as an audio amplifier for example, via SPI messages,. If an adjunct processor such as a second separate microprocessor running an operating system such as Microsoft Windows CE™ (WinCE™) is added, it would be advantageous to allow control of the audio amplifier, or other user interface, by this adjunct processor. Since the main processor is also used for other real-time or system critical functions of a radiotelephone, it would not be appropriate or efficient to have the adjunct processor control the SPI. It would instead be necessary for the adjunct processor to send messages to the main processor to enable the particular user interface of interest, using another interface such as a UART.

Accordingly, it would be desirable if a peripheral interface were configured so that multiple master control units could control the peripheral. It would also be beneficial if this could be accomplished in a transparent manner. Moreover, it would also be of benefit to accomplish this without the use of control signal multiplexing, in order to reduce complexity and to use the radiotelephone components more efficiently.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE INVENTION

The present invention describes a method and apparatus to allow an adjunct processor to have shared master control access to a slave peripheral, while a main master unit would have exclusive control over configuration SPI bits. This improvement is provided without the need for multiplexing and is software configurable. The adjunct processor operation would not be affected and operation would be transparent.

The present invention provides an apparatus to allow two SPI master devices to share access to a common set of SPI control bits in a slave device. In practice, there are few bits in a typical slave device for which shared access is appropriate. However, the dual access SPI of the present invention allows two central processing units (CPUs), or master units, logical control of some or all of the slave device's control bits. The basic hardware scheme is shown in FIG. 3.

Figure 1:
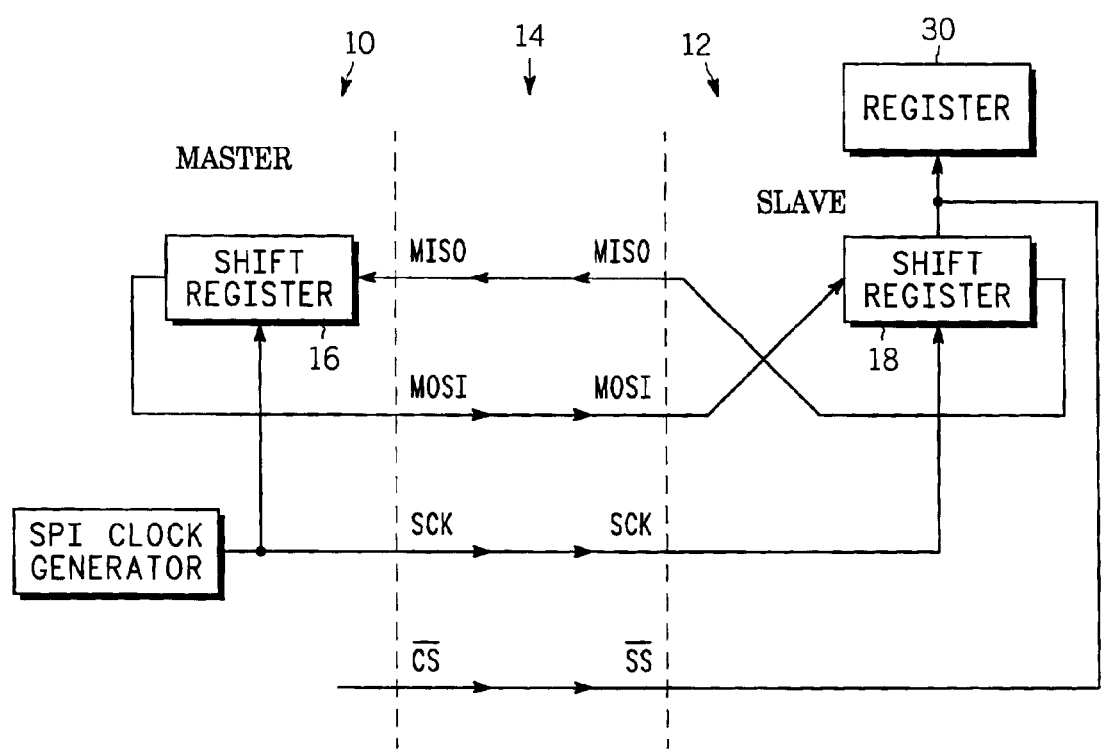
FIG. 1 is a block diagram of a prior art single access serial peripheral interface.
Figure 2:
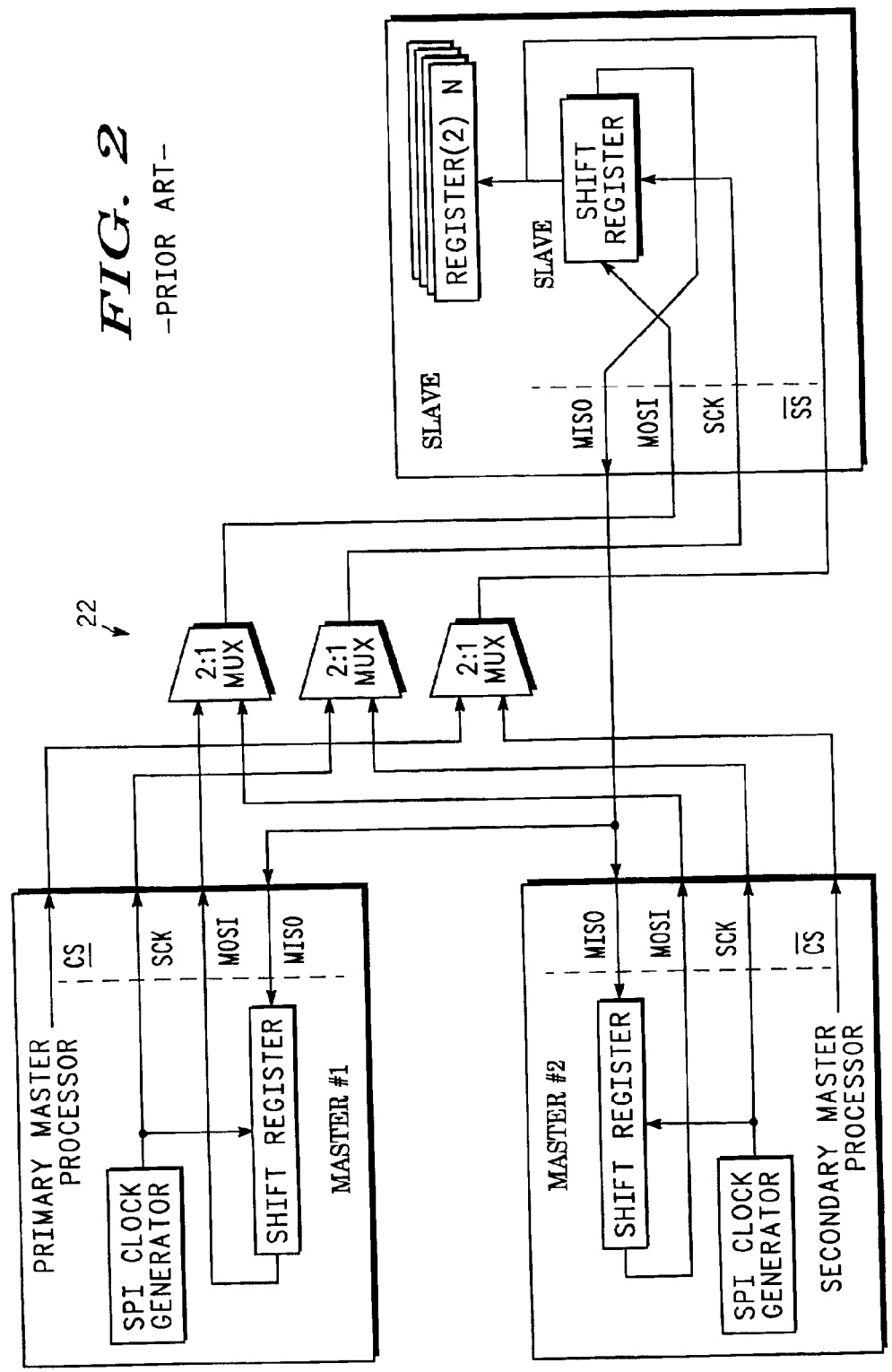
FIG. 2 is a block diagram of a prior art dual access serial peripheral interface.
Figure 3:
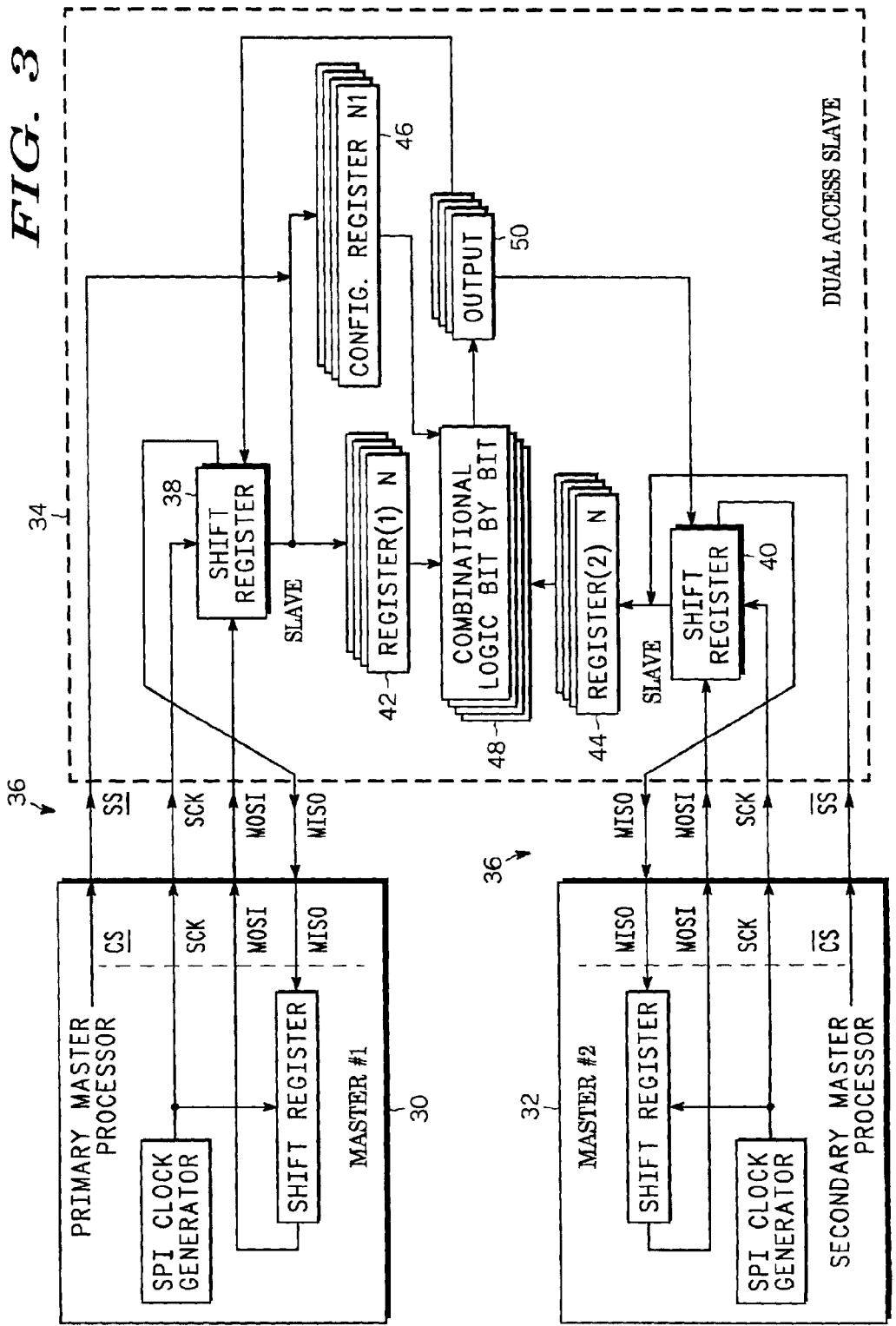
FIG. 3 is a simplified block diagram of a dual access serial peripheral interface, in accordance with the present invention.

FIG. 3 shows a first embodiment of an apparatus to allow dual master control of a slave peripheral unit, in accordance with the present invention. A first and second master control unit, shown as primary master processor 30 and secondary master processor 32, each share control of a slave peripheral unit 34. A dual-bus slave peripheral interface 36 is coupled between the master control units and the slave peripheral unit 34, the interface includes a data communication bus for carrying the control bits from the master processors to the slave unit. The slave peripheral unit is operable by a shared subset of the control bits from the master control units. The master processors operate the same way as described for FIG. 1. Each of the master processors provides control bits to respective shift registers in the slave unit 34. The primary master processor 30 provides control bits to a first input shift register 38 in the slave unit 34. The secondary master processor 32 provides control bits to a second input shift register 40 in the slave unit 34. The input shift registers 38,40 have their data clocked into respective latch registers 42,44 under clock control of the respective master processors 30,32, using an operation similar to that describes for FIG. 1.

The primary master processor 30 also provides configuration bits passed through the shift register 38 to a configuration register 46 in the slave unit 34. The configuration bits are used to configure a logic block 48 coupled to the communication bus and configurable by a set of configuration bits accessible by only a first master control unit 30. The logic configuration block 48 controls access of the shared subset of control bits to the slave peripheral unit 34, which determines how the slave unit 34 responds to the inputs data from both of the master processors 30,32. The input registers 42,44 are coupled to provide the shared control bits from the master control units to the logic configuration block 48. Both of the master processors are free to address and provide control bits to the slave unit and logic configuration block 48 at any time. However, the primary master processor 30 is the only master unit allowed to configure the slave unit as to how to respond to those control input bits.

Each control bit from each master processor is input to the combinational logic block 48, which operates on those bits using logic configured by the configuration register 46, as will be explained below. The logical output of the input bits from the latch registers 42,44, written to by each master processor unit, 30,32, is output, on a bit by bit basis, to an output 50 that directly controls the operation of the slave unit. It is not necessary that these bits be synchronized when input into the combinational logic block. As soon as a bit in the register changes state, its logic effect should be immediately felt, independent of the state of the corresponding bit from the other master. Of course, in some cases the configuration logic will cause bits from one of the masters to be ignored. The combinational logic block will never see temporary transitions while new data is being clocked in, as it is typically double buffered. The output 50 performs the same function as the latch register outputs (such as shown as 20 in FIG. 1). The slave unit 34 can optionally use the output 50 to pass data directly back to the respective master units 30,32 using the associated shift registers 38,40 and associated MISO lines.

As an operational example, the input latch registers 42,44 for the primary and secondary master processors output control bits $\{A_0, A_1, A_2, \ldots A_N\}$ and $\{B_0, B_1, B_2, \ldots B_N\}$, respectively. The configuration logic register is first loaded with control bits $\{D_{0A}, D_{0B}, D_{1A}, D_{1B}, \ldots D_{iA}, D_{iB} \ldots, D_{NA}, D_{NB}\}$, wherein the $D_{iA}, D_{iB}$ bits control a configurable logic function of $\{A_i, B_i\}$. The configuration bits set logic configuration bits in the logic configuration block and define the control of the common subset of shared control bits by the master control units. Specifically, the configuration bits set a logic operation in the logic configuration block. The logic operation then operates on the shared control bits from the master control units to define a combined output set of control bits $\{C_0, C_1, C_2 \ldots C_N\}$ to control the peripheral. For example, the configurable logic function for the first bit could set $C_0=A_0$, $C_0=B_0$, or $C_0$ equal to any logical combination of $A_0$ and $B_0$, including AND, OR, NAND, NOR, XOR, and the like. The exact logic function on a bit by bit basis will be controlled by the logic configuration register 46 accessible only by the primary master processor 30. This allows the primary master processor to control which SPI bits of the slave device will be subject to dual access and in what manner.

In practice, one can consider the above embodiment in operation in a cellular radio communication device. The device will have a main processor to control all the device functions. One example is having the device main processors use SPI bits to enable an audio earpiece amplifier. In a scenario with an adjunct processor running an operating system such as Palm™, Linux, or a WinCE™ environment for example, external circuitry can be devised to easily allow audio levels to be summed in an analog fashion using standard op-amp summation techniques. The main processor would generate audio using the digital-to-analog converter (DAC) in the audio portion of the radiotelephone, while the adjunct processor would generate tones using its own audio DAC.

While the audio can be summed easily, the main processor is the only processor allowed to enable the earpiece amplifier. If the WinCE processor needed to enable the amplifier, it would normally be required to send a message to the main processor and wait for the main processor to enable the amplifier. This messaging scheme leads to unacceptable audio latencies for short tones, as in the case of keypad press tones, for example. The shared access scheme described for the present invention would allow both the main and adjunct processor to control the earpiece amplifier as an OR function, avoiding any audio latencies.

Figures 4, 5:
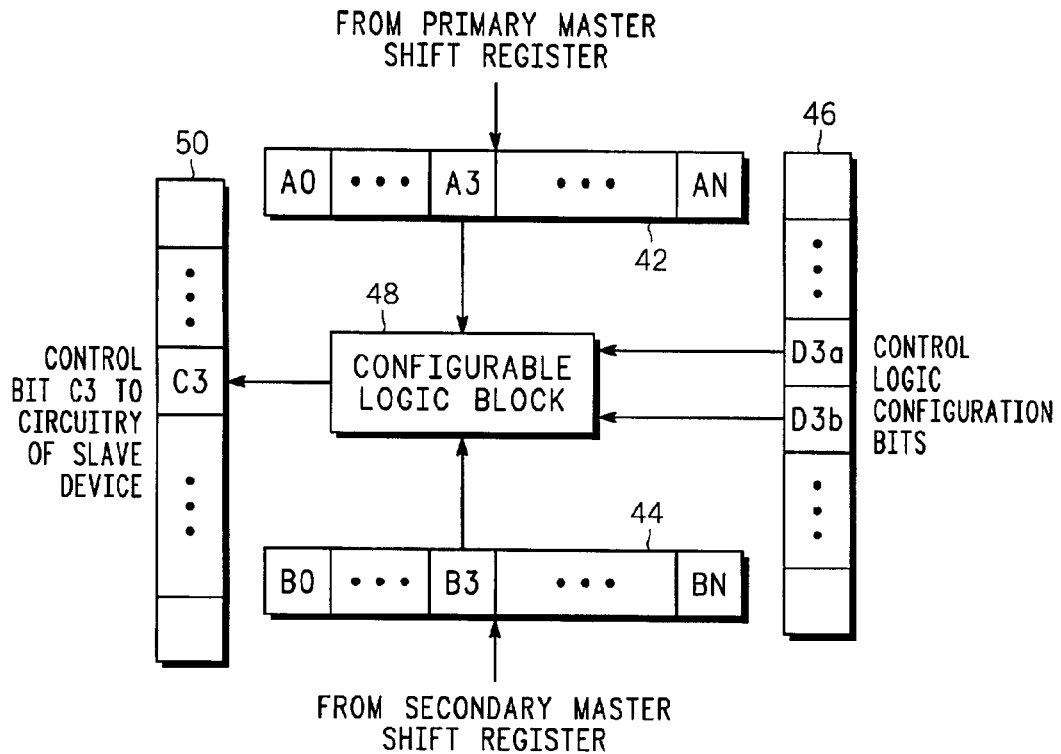
FIG. 4 is a simplified operational block diagram of the configurational logic block of FIG. 3.
FIG. 5 is table of example configuration logic bits used in the configurational logic block of FIG. 4.

In the example shown in FIG. 4, bit C3 could be the earpiece enable bit for the amplifier (slave peripheral). The main processor would write the appropriate logic configuration bits, $D_{3a}$ and $D_{3b}$, into the configuration register 46, which are entered into the logic block 48 for its configuration. For example, $D_{3a}$ and $D_{3b}$ would be set to 0 and 1 and written into the logic block 48 to provide for OR logic control (C3=A3+B3), as shown in FIG. 5. More or lesser numbers of bits can be used to increased or decrease the number of available logic functions. For example, a single configuration bit D3 could defined a logical muxing function, e.g., C3=A3 (if D3=0) and C3=B3 if D3=1.

In a preferred embodiment, the second main control unit or adjunct processor is operable to read the configuration register to confirm accessibility of the slave peripheral unit by the adjunct processor, or to read the output 50 containing the result of the programmable logic to confirm operability of the slave peripheral unit by instructions sent by the adjunct processor. This would give the adjunct processor the ability to determine what resources it has access to, or to determine if a resource failure was a result of being denied access by the primary processor. For example, in an application with an adjunct processor, a resource such as a digital memory card could be shared by the two master processors. The control bit to enable the regulator to power the memory card could be shared. The adjunct processor could determine if it had access to the resource by examining the configuration register or the output. Moreover, if a resource failure occurred, the adjunct processor could again examine the configuration or output to determine if resource failure was the result of the primary processor overriding the access to the resource by the secondary processor.

Figure 6:
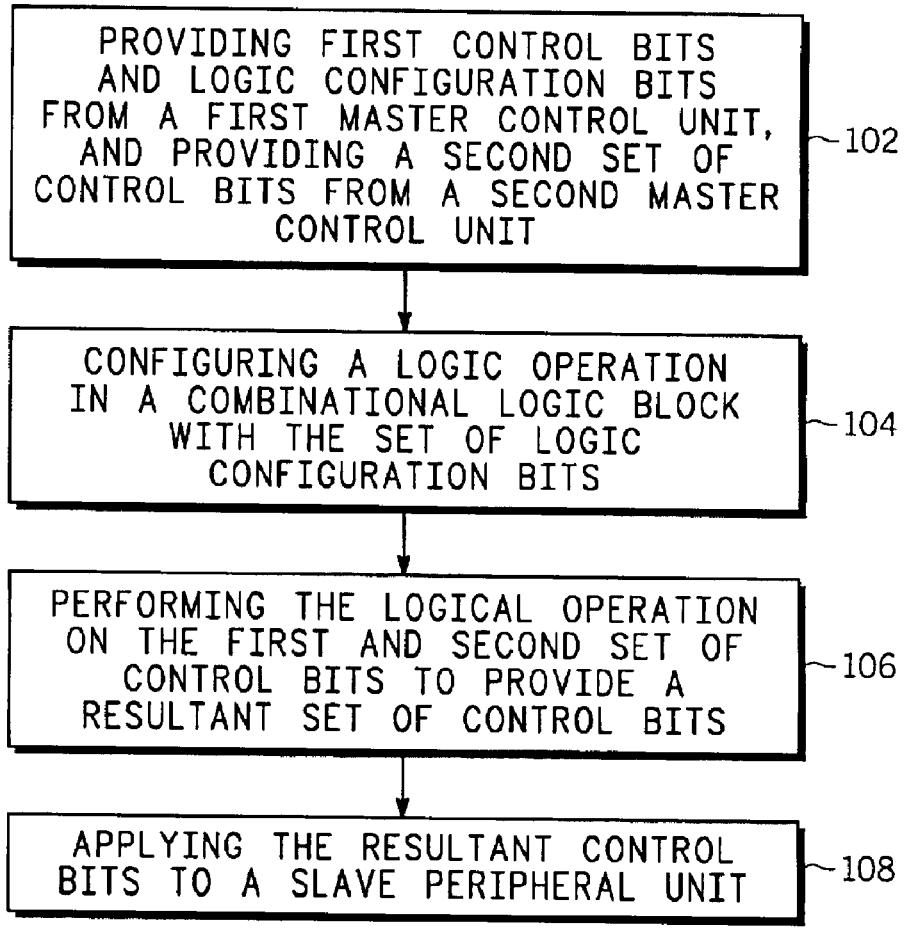
FIG. 6 is a simplified flow chart dual access control of a peripheral, in accordance with the present invention.

Referring to FIG. 6, the present invention also includes a method 100 of providing dual master control of a slave peripheral unit including a first step 102 of providing a first set of control bits and a set of logic configuration bits from a first master control unit, and providing a second set of control bits from a second master control unit. A next step 104 includes configuring a logic operation in a combinational logic block with the set of logic configuration bits. A next step 106 includes performing the logical operation on the first and second set of control bits to provide a resultant set of control bits. A next step 108 includes applying the resultant control bits to a slave peripheral unit.

In a preferred embodiment, the providing step includes providing the control bits serially on a serial communication bus in a common format. More preferably, the method of the present invention includes a further step of reading the configuration bits by the second master unit to confirm accessibility of the slave peripheral unit. Alternatively, the present invention includes a further step of reading the resultant control bits by the second master unit to confirm operability of the slave peripheral unit.

The present invention is used to advantage in serializing communication with the peripheral (connected to the main processor over the data bus), which reduces the number of signal lines used to interconnect different sub-systems of the radiotelephone. This corresponds to a reduction of hardware requirements, an important factor in reducing the size of radiotelephones. Additionally, the present invention is fast enough to provide for simultaneous connection, and operation, of several peripheral devices, to the radiotelephone.

The present invention can employ a real-time, on-demand communication protocol or use a time-slotted data bus for sending information between the central processor and other function blocks of a radiotelephone (including peripheral devices which may be externally attached or internal to the cellular radiotelephone). The communication bus can utilize at least one unidirectional transmission, from the "master" (the central processor in the radiotelephone) to other devices with data transfer apparatus to accept messages, or from other devices to the bus master or to other devices which may be connected to the central signal processing and computing portions of the radiotelephone. In addition, the arbitration logic described for the present invention can be applied to other parallel or serial protocols. It could even cover a "mixed mode" of the above protocols. In general, the present invention is applicable to any synchronous serial digital data format utilizing a clock and data lines, configured to transfer single bits on each clock edge from a sending device to a receiving device. It is also possible that the sending device (which initiated the transfer) can also receive a data bit from the receiving device, on a clock edge different than that used to latch data into the receiving device.

Although the invention is described with radiotelephones as the preferred embodiment, the invention may just as well be employed in other applications having similar requirements or requirements necessitating interconnection with equipment employing the present invention. For example, the apparatus of the present invention can be contained within peripheral devices such as a facsimile machine, cellular mobile radiotelephone handset, a user interface portion of a portable or mobile cellular radiotelephone, or other devices which may be connected to a cellular radiotelephone's main processing block. The present invention can also be implemented in all wireless/cordless phone products and portable computing devices such as personal computers and personal digital assistants. In particular, the invention would find benefit in all products that have multiple processors with shared resources.

While the invention has been described in detail above, the invention is not intended to be limited to the specific embodiments as described. It is evident that those skilled in the art may now make numerous uses, modifications of, and departures from the specific embodiments described herein without departing from the inventive concepts.

What is claimed is:

1. An apparatus to allow dual master control of a slave peripheral unit, comprising:
   a first master control unit able to provide a first plurality of control bits;
   a second master control unit able to provide a second plurality of control bits;
   a slave peripheral unit operable under the control of a resultant shared subset of the first and second plurality of control bits;
   a slave peripheral interface coupled between the master control units and the slave peripheral unit, the interface including a data communication bus for carrying the control bits; and
   a logic configuration block coupled to the communication bus, the logic configuration block controlling the generation of said resultant shared subset of control bits for the slave peripheral unit according to a logical combination dynamically set by configuration bits from the first master control unit.

2. The apparatus of claim 1, wherein the configuration bits set logic configuration bits in the logic configuration block, the logic configuration bits defining the control of the common subset of shared control bits by the master control units.

3. The apparatus of claim 1, wherein the configuration bits set a logic operation in the logic configuration black, the logic operation operates on the shared control bits from the master control units to define a combined output set of control bits to control the peripheral.

4. The apparatus of claim 1, wherein the slave peripheral unit includes respective first and second input registers coupled to the first and second master control units through the communication bus, the input registers being coupled to provide the shared control bits from the master control units to the logic configuration block, and wherein the slave peripheral unit includes a configuration register accessible to the first master control unit and coupled to provide configuration bits to the logic configuration block.

5. The apparatus of claim 4, wherein the second master control unit is operable to read the configuration register to confirm accessibility of the slave peripheral unit by the second master control unit.

6. The apparatus of claim 4, wherein the slave peripheral unit includes an output to output the logical combination of the shared control bits of the master control units from the logic configuration block.

7. The apparatus of claim 6, wherein the output is coupled to the input registers to output data back to the respective master control units.

8. The apparatus of claim 6, wherein the second master control unit is operable to read the output to confirm operability of the slave peripheral unit by the second master control unit.

9. An apparatus to allow dual master control of a slave peripheral unit, comprising:
   a first master control unit able to provide first control bits;
   a second master control unit able to provide second control bits;
   a slave peripheral unit operable by a shared subset of the control bits from the master control units, the slave peripheral unit including respective first and second input registers to receive the first and second control bits from master control units and a configuration register accessible by the first master control unit;
   a slave peripheral interface including a data communication bus coupled between the first and second master control units and the respective input registers of the slave peripheral unit, the communication bus for carrying the control bits; and
   a logic configuration block coupled to the first and second input registers and the configuration register, the logic configuration block controlling generation of the shared subset of control bits for the slave peripheral unit, the logic block configurable by a set of configuration bits from the configuration register.

10. The apparatus of claim 9, wherein the configuration bits set a logic operation in the logic configuration block, the logic operation operates on the shared control bits from the master control units to define a combined output set of control bits to control the peripheral.

11. The apparatus of claim 9, wherein the second master control unit is operable to read the configuration register to confirm accessibility of the slave peripheral unit by the second master control unit.

12. The apparatus of claim 9, wherein the slave peripheral unit includes a output to output the logical combination of the shared control bits of the master control units from the logic configuration block, and wherein the second master control unit is operable to read the output to confirm operability of the slave peripheral unit by the second master control unit.

13. An apparatus to allow dual master control of a slave peripheral unit, comprising:
   first and second master control units, each control unit able to provide control bits;
   a slave peripheral unit operable by a shared subset of the control bits from the master control units, the slave peripheral unit including respective first and second input registers that receive the first and second control bits from master control units and a configuration register accessible by the first master control unit;
   a slave peripheral interface including a data communication bus coupled between the first and second master control units and the respective input registers of the slave peripheral unit, the communication bus being a serial bus and for carrying the control bits; and
   a logic configuration block coupled to the input registers and the configuration register, the logic configuration block controlling access of the shared subset of control bits to the slave peripheral unit, the block configurable by a set of configuration bits from the configuration register.

14. A method of providing dual master control of a slave peripheral unit, the method comprising the steps of:
   providing a first set of control bits and a set of logic configuration bits from a first master control unit, and providing a second set of control bits from a second master control unit;

configuring a logic operation in a combination logic block with the set of logic configuration bits;

performing the logical operation on the first and second set of control bits to provide a resultant set of control bits; and applying the resultant control bits to a slave peripheral unit.

15. The method of claim 14, further comprising the step of reading the configuration bits by the second master unit to confirm accessibility of the slave peripheral unit.

16. The method of claim 14, wherein the providing step includes providing the control bits serially.

17. A method of providing dual master control of a slave peripheral unit, the method comprising the steps of:

providing a first set of control bits and a set of logic configuration bits from a first master control unit, and providing a second set of control bits from a second master control unit;

configuring a logic operation in a combination logic block with the set of logic configuration bits;

performing the logical operation on the first and second set of control bits to provide a resultant set of control bits;

applying the resultant control bits to a slave peripheral unit; and reading the resultant control bits by the second master unit to confirm operability of the slave peripheral unit.

18. A method of generating control bits for a slave peripheral unit responsive to bits from first and second master control units, the method comprising the steps of:

receiving a first set of bits and at least one logic configuration bit from the first master control unit;

receiving a second set of bits from the second master control unit;

configuring a logic operation responsive to said at least one logic configuration bit;

performing the logical operation on the first and second set of bits to selectively combine the bits according to the configured logic and generate a resultant set of bits; and applying the resultant set of bits as control bits to the slave peripheral unit.

19. A slave device comprising:

a first input for first control bits generated by a first master control unit;

a second input for second control bits generated by a second master control unit; and a combinational logic block responsive to logic configuration bits received from said first master control unit for configuring a dynamic logic combination of said first and second set of bits, the combinational logic block outputting resultant control bits for the slave device derived from a combination of the first and second sets of bits.

20. The slave device of claim 19, further comprising first and second registers for the first and second control bits, the registers to provide first and second control bits from the first and second master control units to the combinational logic block.

21. The slave device of claim 19, further comprising a configuration register accessible to the first master control unit and coupled to provide configuration bits to the combinational logic block.

* * * * *